United States Patent [19]

Iizuka

[11] 4,355,836
[45] Oct. 26, 1982

[54] ASH TRAY ASSEMBLY FOR AN AUTOMOBILE

[75] Inventor: Mitsuru Iizuka, Yokohama, Japan

[73] Assignee: Nissan Motor Company, Limited, Kanagawa, Japan

[21] Appl. No.: 117,639

[22] Filed: Feb. 1, 1980

[30] Foreign Application Priority Data

Mar. 1, 1979 [JP] Japan ................................ 54-24842[U]

[51] Int. Cl.³ .............................................. B60N 3/12
[52] U.S. Cl. .................................... 296/37.9; 131/231
[58] Field of Search ................... 296/37.8, 37.9, 37.12; 131/231, 235, 241, 242

[56] References Cited

U.S. PATENT DOCUMENTS

| | | | |
|---|---|---|---|
| 2,652,838 | 9/1953 | Wolfe | 296/37.9 |
| 2,660,180 | 11/1953 | Endicott et al. | 296/37.9 |
| 3,460,877 | 8/1969 | DeBoer | 296/37.9 |

FOREIGN PATENT DOCUMENTS

| | | |
|---|---|---|
| 801758 | 1/1951 | Fed. Rep. of Germany . |
| 957279 | 1/1957 | Fed. Rep. of Germany ..... 296/37.9 |
| 1143726 | 2/1963 | Fed. Rep. of Germany . |
| 1300330 | 7/1969 | Fed. Rep. of Germany . |
| 2306601 | 10/1976 | Fed. Rep. of Germany . |
| 832467 | 4/1960 | United Kingdom . |

*Primary Examiner*—Joseph F. Peters, Jr.
*Assistant Examiner*—Ross Weaver

[57] ABSTRACT

An ash tray assembly for an automobile is disclosed which comprises a case fixed substantially horizontally beneath an instrument board of an automobile, an ash tray which is pushed into and pulled out from the case and a fire proof protector means which consists of a spring steel plate interposed between the case and the ash tray in such a way as to project obliquely in the upward direction and cover the front surface of the instrument board when the ash tray is pulled out from the case. The rear end portion of the fire proof protector means is turned back upwardly in such a way as to form substantially a U-shape and the end portion thus turned back upwardly is fixed to the case.

3 Claims, 6 Drawing Figures

ASH TRAY ASSEMBLY FOR AN AUTOMOBILE

BACKGROUND OF THE INVENTION

The present invention relates to an ash tray assembly for an automobile, and more particularly to an improvement in an ash tray assembly of a type to push an ash tray into and pull out the ash tray from a case provided beneath an instrument board of an automobile.

As shown in FIG. 1 and FIG. 2, an ash tray assembly for an automobile of this kind is conventionally constituted by an ash tray 1 for storing smokers' tobacco remainings 2 or ashes which is pushed into and stored in a case 3 provided beneath an instrument board 4 for an automobile and a fire proof protector means 5 which consists of a spring steel plate and of which the rear end portion is fixed to the ash tray 1 with a spacer 6 interposed therebetween.

In such a conventional ash tray assembly, however, there is a defect in that the inner space of the ash tray 1 for storing smokers' tobacco remainings 2 or ashes becomes narrow due to the provision of the spacer 6 with which the rear end of the protector means 5 is fixed to the ash tray 1. Further, since the protector means 5 is fixed to the ash tray 1, there is another defect in that the protector means 5 becomes an obstacle in putting away smokers' tobacco remainings or ashes accumulated in the ash tray 1, and thus the operation to make clean the ash tray 1 becomes troublesome.

Moreover, since the fire proof protector means 5 is fixed at the rear end portion of the ash tray 1, there is still another defect in that the fire proof protector means 5 does not cover the front surface of the instrument board 4 unless the ash tray 1 is pulled out from the case 3 to full extent. Under circumstance, there is such fear that the instrument board 4 of which the front surface is formed of resin is burnt if the ash tray 1 is pulled out halfway and used, thereby causing the fire accident.

SUMMARY OF THE INVENTION

With the above in mind, an object of the present invention is to provide an ash tray assembly for an automobile of which the inner space for storing smokers' tobacco remainings or ashes is widened.

Another object of the present invention is to provide an ash tray assembly for an automobile which makes easy the operation to put away smokers' tobacco remainings or ashes accumulated in the ash tray by eliminating the use of spacer for fixing the fire proof protector means.

A further object of the present invention is to provide an ash tray assembly of which the protector means effectively covers the front surface of the instrument board even if the ash tray is pulled out halfway and used.

According to the present invention, there is provided an ash tray assembly for an automobile comprising a case which is horizontally fixed beneath an instrument board of an automobile, an ash tray which is pushed into and pulled out from said case and a fire proof protector means which consists of a spring steel plate interposed between the case and the ash tray in such a way as to project obliquely in the upward direction and cover the front surface of the instrument board when the ash tray is pulled out from the case, wherein the rear end portion of the fire proof protector means is turned back upwardly in such a way as to form substantially a U-shape and the end portion thus turned back upwardly is fixed to the case. The ash tray assembly for an automobile in accordance with the present invention further comprises slide grooves of desired length which are formed in the inner walls on both sides of the case, bearing means which are formed on both sides substantially at the intermediate position of the fire proof protector means and a rod which is inserted in the bearing means on both sides so that the fire proof protector means may make a pivotal movement therearound, both ends of the rod being fitted in the slide grooves.

BRIEF DESCRIPTION OF THE DRAWINGS

The features and advantages of an ash tray assembly for an automobile in accordance with the present invention will become apparent from the following description taken in conjunction with the accompanying drawings, in which.

In all the drawings, the same reference numeral indicates the same or corresponding element.

DETAILED DESCRIPTION OF THE PRESENT INVENTION

Figure 1:
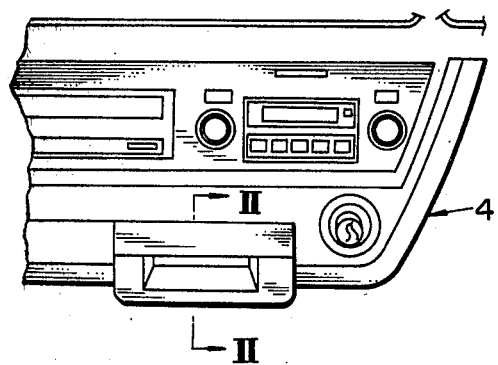
FIG. 1 is a front view showing a conventional ash tray assembly for an automobile which is provided beneath an instrument board.
Figure 2:
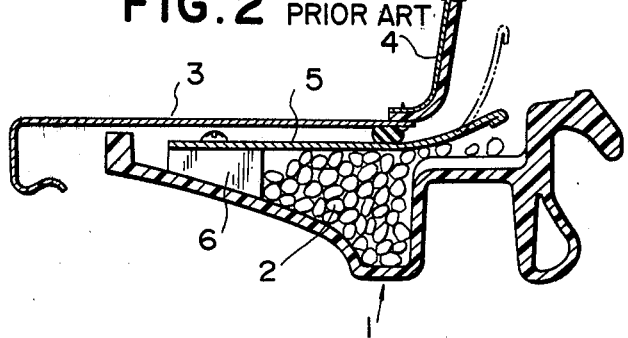
FIG. 2 is a cross-sectional view taken along II—II line in FIG. 1.

The present invention will now be described in terms of a preferred embodiment, and with reference to FIG. 3, FIG. 4, FIG. 5 and FIG. 6.

Reference numeral 10 denotes a case which is provided substantially horizontally beneath an instrument board 11 for an automobile. As clearly seen from the disassembled perspective view of FIG. 4, lower end portions 12, 12 of the side plates 13, 13 of this case 10 is bent in such a way as to extend inwards obliquely in the downward directions. Holes 14, 14 are formed in the side plates 13, 13 for mounting a pair of protector guide means 15, 15.

A horizontal slide groove 16 is formed in the inner surface of each of the pair of protector guide means 15, 15. A pair of projections 17, 17 and a pair of supporting spring members 18, 18 are formed respectively on the outer surface and beneath the bottom surface of each of the pair of protector guide means 15, 15. In this case, the protector guide means 15, 15, the projections 17, 17 and the supporting spring members 18, 18 are preferably formed of synthetic resin in integral with one another.

Reference numeral 19 denotes a fire proof protector means which consists of a spring steel plate and is interposed between the case 10 and an ash tray 20 in such a way as to project oblique in the upward direction and cover the front surface of the instrument board 11 in a manner as mentioned afterwards when the ash tray 20 is pulled out from the case 10. The rear end portion 21 of the fire proof protector means 19 is turned back upwardly in such a way as to form substantially a U-shape. At the end portion thus turned back upwardly are formed a pair of holes 22, 22 in such a way as to correspond to a pair of holes 23, 23 which are formed in the case 10. The end portion of the fire proof protector means 19 turned back upwardly as mentioned above in adapted to be mounted to the case 10 by aligning the holes 22, 22 with the holes 23, 23 and inserting screws 24, 24 in the holes 22, 23 by turning the screws 24, 24 so as to firmly hold the case 10 and the fire proof protector means 19 together. The central portion 25 at the rear half of the fire proof protector means 19 is cut away so as to make easy the bending of the fire proof protector means 19.

A pair of bearing means 26, 26 are provided on both sides substantially at the intermediate position of the fire proof protector means 19. Reference numeral 27 denotes a rod which is inserted in the bearing means 26, 26 on both sides so that the fire proof protector means 19 may make a pivotal movement therearound, and both ends of the rod 27 is adapted to be fitted in the slide grooves 16, 16 formed in the inner surfaces of the pair of protector guide means 15, 15.

A pair of horizontal protrusions 28, 28 are formed on the outer surfaces of the ash tray 20. The upper surface 29 of each of the protrusions 28, 28 extends horizontally but the lower surface 30 thereof is tapered so that the lower end 12 of each of the side plates 13, 13 of the case 10 may slidably engage the tapered surface 30 and support the ash tray 20.

Stepped portions 31, 31 are formed on the upper edges of both side walls 32 at the position near the handle 32 of the ash tray 20 in such a way that they engage the bearing means 26, 26 to prevent the fire proof protector 19 from protecting obliquely in the upward direction by the spring force thereof when the ash tray 20 is pushed into and stored in the case 10, or press and bend the U-shaped rear end portion of the fire proof protector means 19 obliquely in the downward direction to a further extent when the ash tray 20 is once pulled out from the case 10 and thereafter is again pushed into the case 10. In continuation with the stepped portions 31, 31, there are also formed flat portions 33, 33 and sloped portions 34, 34 on the upper edges of both the side walls 32, 32 of the ash tray 20.

The case 10, the protector guide means 15, 15, the fire proof protector means 19, the rod 27 and the ash tray 20 which are respectively constituted as mentioned above are assembled together as follows.

The rear end portion of the fire proof protector means 19 which is turned back upwardly is firmly fixed to the case 10 by aligning the holes 22, 22 of the fire proof protector means 19 with the holes 23, 23 of the case 10 and inserting the screws 24, 24 in the holes 22, 23 by turning the screws 24, 24. Both ends of the rod 27 which is passed through the bearing means 26, 26 of the fire proof protector means 19 are fitted in the slide grooves 16, 16 of the protector guide means 15, 15, which are mounted to the case 10 by fitting the projections 17, 17 in the holes 14, 14 formed in the side plates 13, 13 of the case 10. The ash tray 20 is inserted into the case 10 in such a way that the lower end portions 12, 12 of the case 10 make a slidable engagement with the tapered surfaces 3, 30 of the protrusions 28, 28 on both sides of the ash tray 20 and support the ash tray 20. In this case, the spring support members 18, 18 of the protector guide means 15, 15 are positioned on the flat upper surfaces 29, 29 of the protrusions 28, 28 as clearly seen from FIG. 5.

Figure 3:
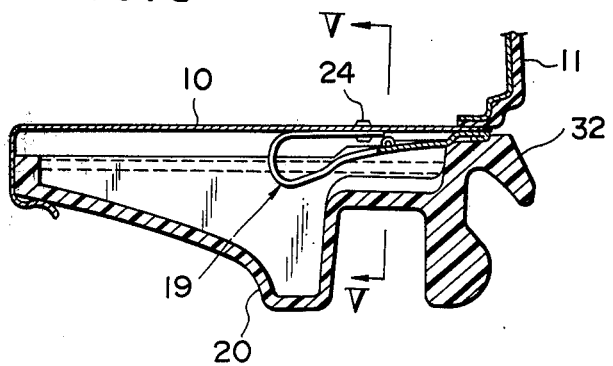
FIG. 3 is a cross-sectional view showing the structure of an ash tray assembly for an automobile of one embodiment in accordance with the present invention.
Figure 4:
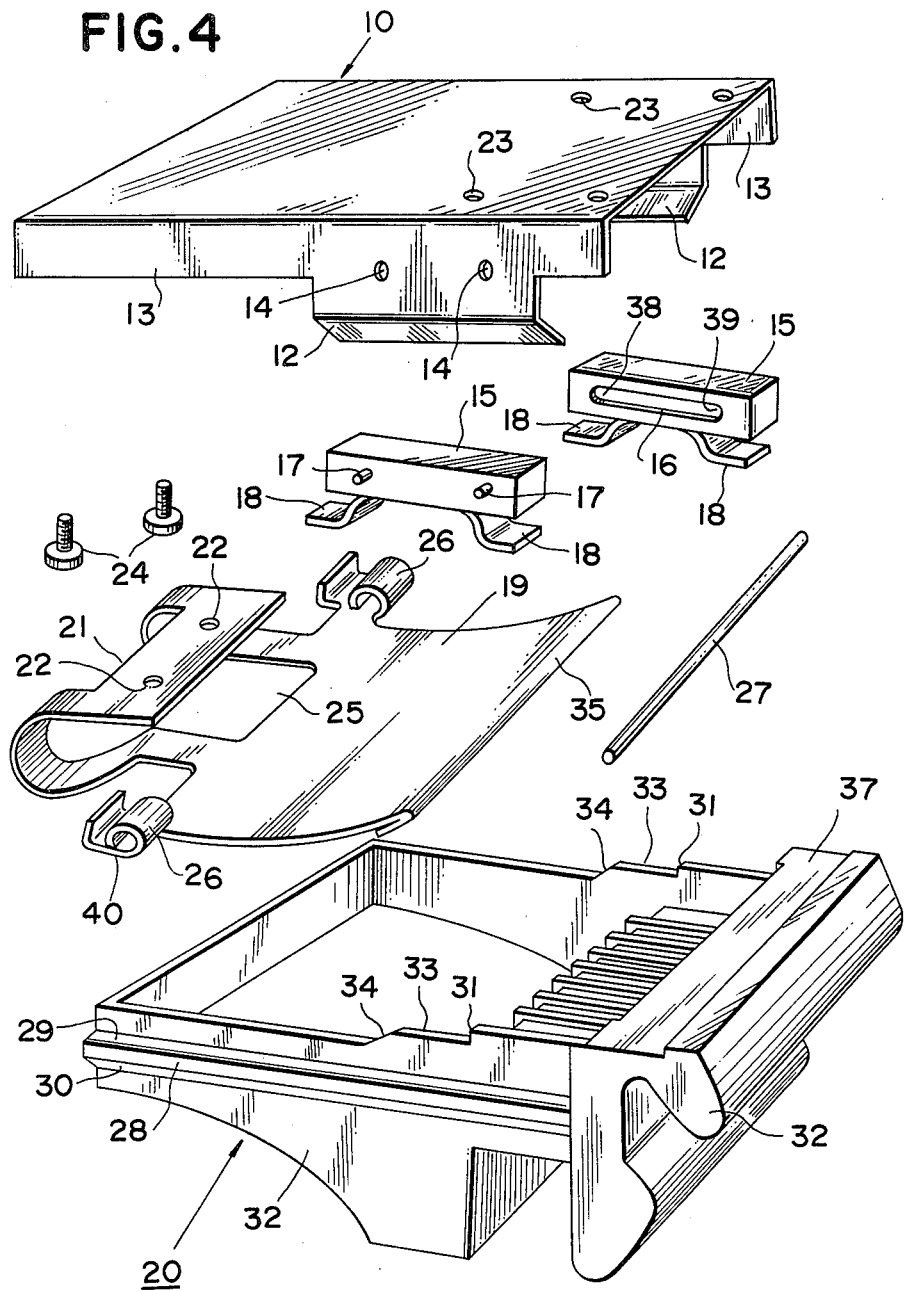
FIG. 4 is a perspective view showing the ash tray assembly for an automobile of FIG. 3 in a disassembled status.
Figure 5:
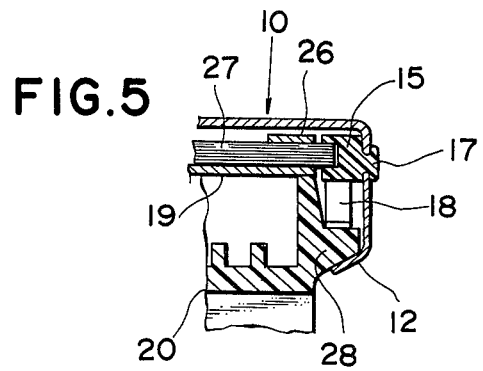
FIG. 5 is a cross-sectional view taken along V—V line in FIG. 3.
Figure 6:
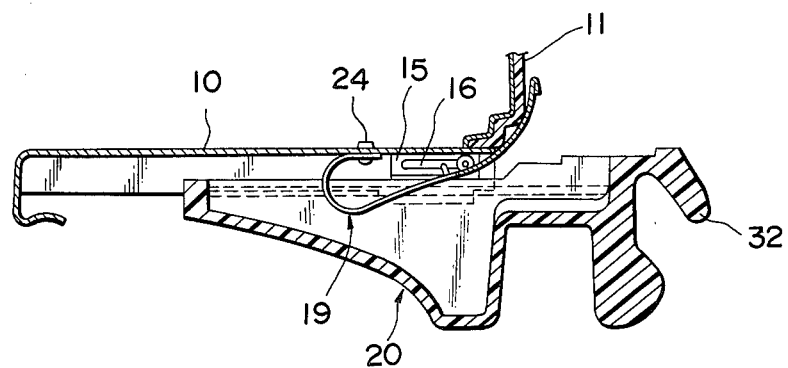
FIG. 6 is a cross-sectional view of the ash tray assembly for an automobile shown in FIG. 3 in the status of having pulled out the ash tray halfway.

When the ash tray 20 is completely pushed into and stored in the case 10, the forward end portion 35 of the fire proof protector means 19 is clasped between the forward edge 36 of the case 10 and the upper surface 37 of the handle 32 of the ash tray 20 as shown in FIG. 3. Then, as the ash tray 20 starts to be pulled out from the case 1, the fire proof protector means 19 is pushed forward by the spring force of the U-shaped rear end portion thereof and the rod 27 which is passed through the bearing means 26, 26 starts to move along the slide grooves 16, 16 of the protector guide means 15, 15 in the horizontal direction from the rearward ends 38, 38 towards the forward ends 39, 39 thereof. During this sliding movement of the rod 27, the flat lower surfaces 40, 40 of the bearing means 26, 26 are in contact with and slide on the flat portions 33, 33 on the upper edges of the ash tray 20. If the rod 27 reaches the forward ends 39, 39 in the slide grooves 16, 16, the sliding movement of the rod 27 is stopped, whereupon the fire proof protector means 19 makes a pivotal movement around the stopped rod 27 and fully projects obliquely in the upward direction. Thus, the front surface of the instrument board 11 is fully covered with the fire proof protector means 19 as shown in FIG. 6 even if the ash tray 20 is not pulled out from the case 10 to full extent.

When the ash tray 20 is pulled out from the case 10, and then the ash tray 20 starts to be pushed into the case 10 again, the stepped portions 31, 31 on the upper edges of the ash tray 20 engage the bearing means 26, 26 and push the same, thereby the rod 27 makes a sliding movement along the slide grooves 16, 16 of the protector guide means 15, 15 from the forward ends 39, 39 to the rearward ends 38, 38. In this case, the flat lower surfaces 40, 40 of the bearing means 26, 26 are in contact with the flat portions 33, 33 on the upper edges of the ash tray 20. During this sliding movement of the rod 27, the U-shape rear end portion of the fire proof protector means 19 is pushed and bent. And thus, the ash tray 20 is stored in the case 10 as shown in FIG. 3.

As will be clear from the foregoing description, an ash tray assembly for an automobile in accordance with the present invention is constituted in such a way that the rear end portion of the fire proof protector means 19 is turned back upwardly to form substantially a U-shape and the end portion thus turned back upwardly is fixed to the case. Accordingly, the space in the ash tray 20 for storing smokers' tobacco remainings or ashes is widened. In addition, the use of spacer means 6 employed in the prior art for fixing the fire proof protector means is eliminated, thereby the operation to put away smokers' tobacco remainings or ashes accumulated in the ash tray becomes very easy.

Moreover, the ash tray assembly for an automobile in accordance with the present invention is constituted in such a way that the fire proof protector means 19 makes a sliding movement along the slide grooves 16, 16 and makes a pivotal movement around the rod 27, thereby the fire proof protector means 19 can quite effectively cover the front surface of the instrument board 11 even if the ash tray 20 is pulled out halfway and used.

While the present invention has been described in terms of a preferred embodiment, and with reference to the drawings, this is not to be taken as limitative of the present invention, which is rather to be defined by the appended claims.

For example, the present invention is not limited to an ash tray assembly for an automobile but is likewise applicable to an ash tray assembly which is mounted to a console provided that it is of a type to pull out an ash tray from and push the ash tray into a case as mentioned above.

What is claimed is:

1. An ash tray assembly adapted for mounting on the instrument panel of an automotive vehicle, comprising:
   (a) a cover plate having its one end portion secured on the upper edge of an opening formed in the instrument panel and extending inwardly of the instrument panel;
   (b) a resilient protecting plate having an inner portion secured on the lower surface of the cover plate, an outer portion outwardly and upwardly extending through the instrument panel opening to cover the instrument panel, and a turned portion between the inner and outer portions, the protecting plate outer portion having a cam member extending therefrom; and
   (c) an ash tray supported by the cover plate for sliding movement along the lower surface of the cover plate into and out of the instrument panel opening, the ash tray having a cam surface for engagement with the protecting plate cam member to push the protecting plate outer portion inwardly with inward movement of the ash tray.

2. An ash tray assembly according to claim 1, wherein the protecting plate cam member comprises projections extending transversely of the projection plate and in the opposite directions from the protecting plate outer portion.

3. An ash tray assembly according to claim 2, wherein the cover plate has therein longitudinally extending grooves receiving the respective projections for guiding movement of the protecting plate outer portion.

* * * * *